June 3, 1958 L. E. NORTON 2,837,693
GAS RESONANCE APPARATUS
Filed Dec. 31, 1952 2 Sheets-Sheet 1

INVENTOR.
LOWELL E. NORTON
BY
ATTORNEY

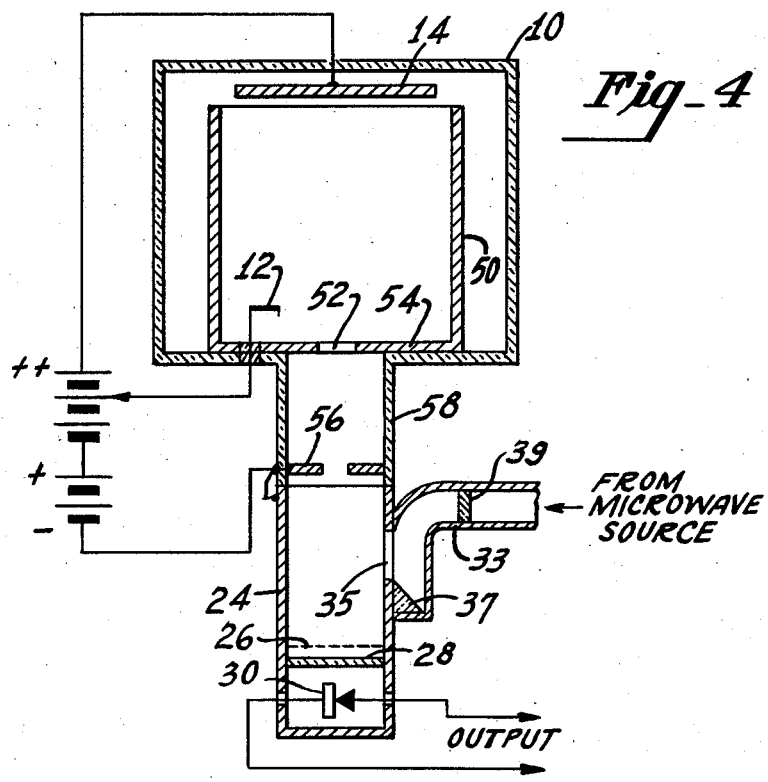

United States Patent Office 2,837,693
Patented June 3, 1958

2,837,693

GAS RESONANCE APPARATUS

Lowell E. Norton, Princeton, N. J., assignor to Radio Corporation of America, a corporation of Delaware Application December 31, 1952, Serial No. 328,871

9 Claims. (Cl. 315—39)

The present invention is related to gas resonance.

It is known that in the gaseous state, molecules are resonant at certain discrete microwave frequencies. Each gas exhibits a certain microwave spectrum of discrete spectral lines. This phenomena of gas resonance has many known uses. For example, it may be used for purposes of gas analysis and frequency control. One of the difficulties encountered in the use of gas resonance spectral lines is that the lines have a definite bandwidth. That is, the spectral line, as a plot of transmission or reflection, against frequency, exhibits a width. Desirably, the width of this line should be small so that the effective Q may be high. The factors which cause the breadth of the line are well understood. These factors of so-called spectral line broadening may be described qualitatively as (1) the natural width of the spectral line; (2) saturation broadening as the result of high power applied to the gas; (3) collision broadening, as the result of interruption of the natural oscillation of or radiation from a molecule because of collision with another gas molecule or with other obstacles such as the container walls; and (4) Doppler broadening, the result of the random motion of the molecules toward and away from the source of the energy. Container enlargement and pressure reduction, to increase the mean free molecular path, to a desired degree, avoids sufficiently for practical work the effects of collision broadening. Saturation broadening may be avoided to a desired degree by the application of sufficiently low power levels. The natural line width is unavoidable, and in any event negligible in practice compared to the broadening caused by the other effects. However, the Doppler broadening of the line remains.

The copending application of Robert H. Dicke and George S. Newell, Jr., Ser. No. 243,082, filed August 22, 1951, now Patent No. 2,749,443, discloses a means and method of reducing the Doppler broadening by a velocity selection among the molecules. This means and method involves the use of a novel gas cell.

It is an object of the present invention to reduce the effects of Doppler broadening, with a novel means and method different from that of the said copending application.

Another object of the invention is to provide a novel means and method of reducing the effects of Doppler broadening.

A further object of the present invention is to increase the effective Q of gas resonance apparatus.

In accordance with a preferred form of the invention, gas ions are produced which are accelerated by an electrical field so that to all the ions is added an equal amount of energy of motion in addition to their various thermal energies. Thereafter, a microwave field is applied to these molecules to induce the desired resonance. As is shown hereinafter, the addition of energy in equal amounts but independently of the thermal energies, causes a decrease in the microwave spectral line width. Another way of adding such energy, in the case of molecules having dipole moments, is to employ an electric field having a field strength variable along a dimension in the direction in which the particles are to be accelerated to have energy added to them.

The foregoing and other objects, advantages, and novel features of the invention will be more fully apparent from the following description when taken in connection with the acompanying drawing, in which like reference characters refer to similar parts, and in which:

Fig. 4 is a cross-sectional view of a preferred embodiment of the invention also employing ion acceleration.

Figures 1, 2, 3:
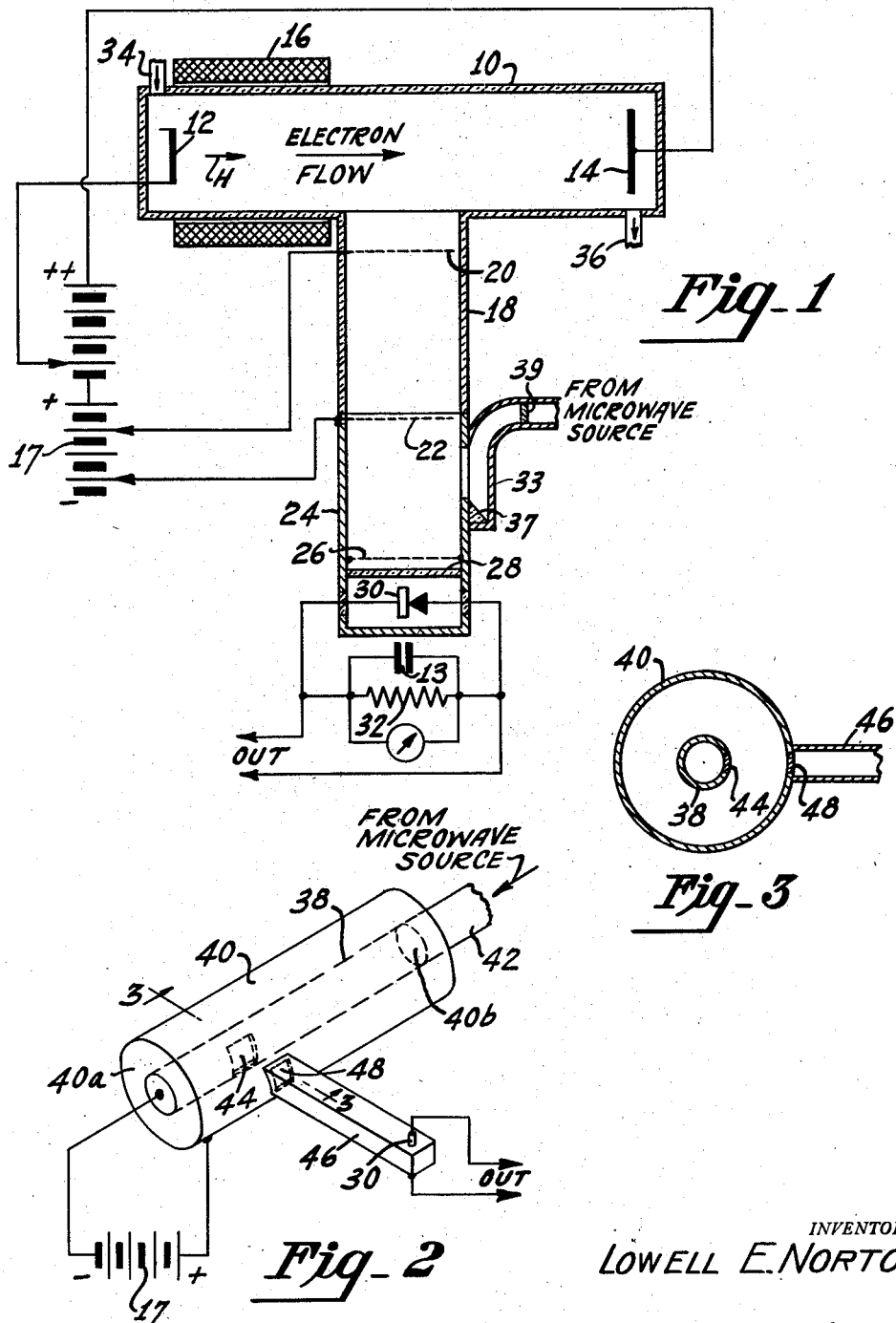
Fig. 1 is a cross-sectional view of one embodiment of the invention using ion acceleration.
Fig. 2 is a perspective view of another embodiment of the invention using the non-uniform electric field for accelerating molecules having a dipole moment.
Fig. 3 is a cross-sectional view of a portion of the apparatus of Fig. 2.

Referring to Fig. 1, a glass envelope 10 has at one end a cathode 12 and at the other end an anode 14. From a suitable voltage supply 17 a voltage is applied between the cathode 12 and anode 14. Preferably a helix 16 surrounds the electron beam near the cathode as it flows from cathode to anode. A current through the helix 16 provides a suitable magnetic field indicated by the arrow H. The magnetic field H tends to collimate the electron stream and to a lesser degree ions which may be travelling in the envelope. The gas molecules to produce the ions are also present in envelope 10. For this purpose the gas to be employed may be sealed within the envelope 10 at a given pressure of, say, less than $10^{-4}$ mm. Hg, or the gas may be continuously fed through from an inlet port 34 to an outlet port 36 at a controlled pressure of the same order. The electrons strike at the gas molecules and ionize them. A branch envelope 18 with its axis at right angles to the axis of envelope 10 has at or near its entrance a grid 20 (or the equivalent) connected to a point on the voltage supply 16 slightly more negative than the cathode, in order to draw the positive ions into the branch envelope 18. An accelerating grid 22 is placed in the branch envelope 18 more remote from the entrance to envelope 10 than grid 20. The walls of the envelopes 10 and 18 are preferably of a suitable glass or ceramic, except for a portion 24 of branch envelope 18 which is preferably metallic. The portion 24 is to serve both as a drift tube and hollow pipe waveguide. Near the end of waveguide portion 24 remote from grid 20 is a further grid 26 followed by a microwave radiation permeable window 28. The waveguide is terminated preferably immediately after window 28 with a crystal diode 30 or other detector type arrangement preferably matched in the neighborhood of the desired operating frequency by any of various means not illustrated but well known. The leads from the terminals of diode 30 may be connected across a suitable resistor 32 shunted by a by-pass capacitor 13. The by-pass capacitor may be omitted if sufficient by-pass capacity is "built in" to the crystal detector holder or into the arrangement of the leads as they pass through the waveguide walls, as is often done. A microwave source is coupled from a waveguide 33 through a long slot directional coupler 35 in a portion having a wall common to waveguide 33 and metallic drift tube 24. A hermetically sealed window 39 may seal waveguide 33. Such suitable means to retain the desired gas pressure may be used, of course, wherever convenient or desirable. The end of waveguide 33 remote from the source is terminated in a matched power absorbing termination 37.

In operation, the electron beam from cathode 12 ionizes the gas molecules. The ionized molecules are drawn into the branch tube 18 at low velocity by grid 20. The ionized molecules then receive a substantial addition of energy by acceleration toward grid 22. In fact, the arrangement thus disclosed provides a voltage drop in the direction of the axis of the branch envelope 18 at right angles to the axis of envelope 10 which, except for variations in thermal velocities, provides the total energy for the ions. By the method described, the ions formed can be made to have low energies which are not very much greater than the original neutral molecule energies. Therefore, when the ions reach the grid 22 the total energy of each ion is its initial thermal energy plus the added energy due to the accelerating field $E_0$ in the region between grid 22 and grid 20. Let the energy imparted to an ion by the electric field be E, and let the initial energy of the same ion or ions be $e$. The total kinetic energy after the addition of the energy E is equal to $e+E$. The velocities of the ion before and after the addition of the energy E, designated respectively $v_1$ and $v_2$, are:

$$v_1 = k\sqrt{e}$$
$$v_2 = k\sqrt{e+E}$$

where $k$ is a proportionality factor. If $e/E$ is very much less than unity, say less than 1/5, a good approximation is $$v_2 = k\sqrt{E}\ (1+e/2E)$$

Accordingly, if the particles are of the same mass, which is assumed here, they all start at grid 20 with a total spread in velocities which is proportional to $e$. They will all fall through an equal electric force field between the grids 20 and 22 along the axis of the branch envelope 18. Because substantially all the particles or ions receive the same increment of energy their velocities will tend to be equalized. The faster ones acquire less increment of velocity than the slower ones acquire to increase their kinetic energy by the same amount. Since Doppler spread is due to velocity spread, an improvement in Doppler spread is secured.

From the foregoing equations, it is readily deduced that the ratio between the spreading velocities of two particles before and after the addition of the energy E is $$R = \tfrac{1}{2}\sqrt{e/E}$$

and is favorable in equalizing or reducing the spread between the velocities. One must take into consideration that there may be a greater spread in the ion velocities than in the neutral molecular velocities. Suppose the neutral particles have energies of 1/40 electron-volt, and the ions energies of 1/2 electron-volt. The velocity spread may be increased approximately in the ratio of $$\sqrt{\frac{\tfrac{1}{2}+\tfrac{1}{40}}{\tfrac{1}{40}}}$$

or about 4.6, due to conversion of neutral particles to ions. Let the voltage between the grids 20 and 22 be 1,000 volts, for example. Then the improvement or reduction in ion velocity spread due to application of the electric force field $E_0$ is in the ratio of $$\tfrac{1}{2}\sqrt{\frac{\tfrac{1}{2}}{1000}}$$

or about .011. So there is a net reduction or improvement in the spread of velocities of the accelerated particles referred to the original spread of the neutral molecules, and the spread is about 4.6×.011 or 5% of what it would be without the application of the present invention, with the assumed voltages. By this method nearly all the particles may be caused to contribute to the narrow band spectral line and hence the useful signal is large.

The contribution of Doppler effects to the spectral line width may be masked in collision broadening. However, collision broadening may be reduced by increasing the size of the vessel or reducing pressure or both so that the improvement is not masked, but is apparent. Further, greater improvement can be secured merely by increasing the accelerating field in which kinetic energy is added to the ions or reducing the initial spread of ion velocity, or both. A manner in which reduction of the initial spread of ion velocities may be obtained is disclosed in Fig. 3, described hereinafter.

The incident microwave energy from the source is applied in such a manner that it is propagated in the same or opposite direction, that is along the same coordinate as the direction of acceleration. Thus the energy from the source is propagated in the waveguide 24 in the same coordinate as the axis of the waveguide 24, in this case toward the detector 30. The Doppler spread of the spectral line detected by the detector is then reduced. The cathode 12, schematically shown, may be of the indirectly heated type. When required, grid wires such as for grid 26 are oriented to permit radiant energy passage.

In Fig. 2, an arrangement is disclosed which may be employed for a gas having molecules with a dipole moment. It is known that such molecules are aligned with and have a force exerted upon them by a non-uniform electric field. A non-uniform field may be obtained by a voltage applied from a suitable source 17 to a pair of concentric electrodes 38 and 40. The inner electrode 38 is hollow and has a solid wall except for aperture 44. The outer electrode 40 is also hollow and solid walled and together with its end plates 40a and 40b, which are of dielectric transparent to electromagnetic radiation, serves as an hermetically sealed envelope. The waveguide 42 is sealed into end plate 40b and continues as electrode 38. If the lead to electrode 38 passes through the other end plate 40a it must also be sealed. The opening 44 is sealed with dielectric. The gas, the molecules of which are to be resonated is contained in the space between the two electrodes at a suitable low pressure, as $10^{-4}$ mm. of Hg or less. The waveguide 46 communicates with the inter-electrode space, and is sealed preferably with a window 48 at its junction with the wall of outer electrode 40.

In operation, the energy applied to waveguide 42, or at least a part of it, escapes at window 44 and is propagated in the radial direction. Due to the non-uniform field which persists between window 44 and the window 48 at the entrance to waveguide 46, the molecules in this space with dipole moments are urged in a direction parallel to the electric field, which is toward the center. It is true that not all the molecules receive equal increments of energy, but since the major force field is in a limited space near the center electrode, it may be shown that a similar result occurs in that the spread of kinetic velocities is restricted to be less than without the field. The energy is radially directed, from window 44 to window 48 in the same direction as that in which the velocity spread is reduced. As a result, the energy from waveguide 46 emitted at opening 44 is applied to the microwave gas of reduced velocity spread and then to the microwave field detector 30. The gas exhibits a spectral line of breadth reduced from the line breadth in the absence of the energy thus added. Hence a higher effective Q may be realized than in an ordinary gas cell in which there is no reduction in the spread of kinetic velocities.

Referring to Fig. 4, an envelope 10 encloses a cathode 12 and anode 14, surrounded by a metallic tube 50 connected to the cathode. The tube 50 has the cathode 12 enclosed within it at one end exposed to the anode 14 at the other end. The tube 50 has an end plate 54 at one end with an opening 52. The opening 52 leads to a grid 56 in the form of a metal ring only through the central aperture of which can ions pass along the enclosing adjunctive waveguide and drift tube 24. The space enclosed by envelope 10 communicates with waveguide 24 through an hermetically sealed neck or sleeve of dielectric 58. As before, the waveguide 24 is sealed at one end by a window 28 and provided with a suitable detector arrangement 30.

In operation, the portion including the cathode 12, anode 14, and shield tube 50 is a known ion source. Ions drift or diffuse through the aperture 52 at velocities near their thermal velocities. These ions are accelerated through the distance between aperture 52 and grid 56. Those which pass through the grid opening into the waveguide and drift tube have, therefore, all received equal increments of kinetic energy which is retained by them as they pass through the waveguide 24, the walls of which are at the potential of grid 56.

Electromagnetic energy from the source is transferred into waveguide 24 to propagate along the same coordinate through the gas ions as that in which the ions have had kinetic eneregy added. These ions are excited by the microwave energy, and exhibit a spectral line of width reduced due to the decrease in velocity spread.

The invention therefore discloses a means and method of decreasing the spectral line width of a microwave resonant gas, by increasing the kinetic energy of the ions above their thermal kinetic energies preferably by applying an electric field to gas ions and preferably all ions having their energy increased in equal amounts, and thereafter radiating the gas or ions with microwave energy propagated along the coordinate in which the energy has been increased. It may be noted that the position of detector and source shown in the illustrated embodiments may be interchanged, but the arrangements as shown are usually preferable as decreasing reflection difficulties. Also, it will be understood that instead of the particular detector arrangement, illustrated for reasons of simplicity, other arrangements known to the art may be employed, especially those taking advantage of the anomalous dispersion characteristic and relying on phase shift rather than amplitude characteristics. The detector output may be employed to control the frequency of the source, for gas analysis, or for other purposes, as known.

It may also be noted that where the microwave radiation incident on the gas or ions is propagated in the same direction as the direction of increased velocity, or increased kinetic energy, the source frequency must be slightly above the usual ion or gas resonance point, due to the Doppler shift. The molecules, whether gas or ions, are then excited at the lower frequency at which they are resonant. However, the energy re-radiated from the excited gas molecules or ions, is also Doppler shifted, and as calculations readily show, if they are moving toward the point of detection, the apparent frequency of the spectral line is increased to the original source frequency. Similarly, where the particles to be resonated are impelled in the direction opposite the direction of microwave radiation propagation, the source frequency must be below the natural molecular resonant frequency by an amount corresponding to the Doppler shift due to the velocity of the median velocity class of particles. The shift due to the velocity of the median velocity class can be computed, or readily found by varying of the source frequency and suitably observing the detector output to note the spectral line.

What is claimed is:

1. The combination comprising a gas, means to contain said gas at low pressure, means to impress upon gas particles of said gas an increase of particle velocity, means to impress upon the increased velocity gas particles a microwave radiation field, the direction of particle acceleration having at least a component in the same coordinate as the direction of propagation of said radiation and detector means to receive said radiation after impression upon and transmission through said gas.

2. The combination comprising, an envelope containing a gas ion source, means to apply to ions produced by said source a voltage accelerating field, means to impress upon said ions microwave radiation after their passage through said field and means to receive said radiation after impression upon and transmission through said ions.

3. The combination comprising, an envelope containing a gas ion source having a cathode, an anode, and a gas to be ionized in the space therebetween, said cathode and anode being arranged on an axis, a pair of spaced electrodes each having at least an opening, said openings lying along a second axis at right angles to said first axis and arranged to have a direct current voltage impressed between them with the electrode more remote from said space to a higher positive voltage than the other electrode, whereby ions produced in said first space may be removed from said first space and drawn into and accelerated through the second space between said openings a metallic tube arranged to receive said ions at their exit from said second space, said tube having an axis aligned with said second axis, and means to directionally couple microwave radiation in the direction away from said openings into said metallic tube, said tube thereby serving both as a drift tube for said ions and a waveguide for said radiation.

4. The combination claimed in claim 3, further comprising means to detect said radiation after its passage through said drift tube.

5. The combination comprising an envelope containing an ion source having an anode and a cathode, a pair of electrodes each having at least an opening, said openings being aligned with said anode and arranged to have a direct current voltage impressed between them with the electrode more remote from said source at a higher positive voltage than the other electrode, whereby ions produced in said ion source may be removed therefrom and drawn into and accelerated through the space between said openings, a metallic tube arranged to receive said ions at their exit from said second space, said tube having an axis aligned with said openings, and means to directionally couple microwave radiation in the direction away from said openings into said tube, said tube thereby serving both as a drift tube for said ions and a waveguide for said radiation.

6. The combination claimed in claim 5, further comprising means to detect said radiation after its passage through said drift tube.

7. The combination comprising a pair of coaxial inner and outer electrodes the inner one of which is hollow to form a hollow pipe waveguide, said electrodes each having a microwave radiation permeable opening in radial alignment with the said opening of the other, a further hollow pipe waveguide positioned to exchange radiation between said last mentioned waveguide and the interopening space, and means to retain a gas at low pressure at least between the aligned openings in the interelectrode space.

8. The combination claimed in claim 7, further comprising means in the said further hollow pipe waveguide to detect said spectral line.

9. Apparatus for securing a spectral line response of reduced Doppler width from a confined body of gas comprising means for ionizing particles of the gas, means for subjecting the ionized particles all to the same accelerating field to add to each the same amount of kinetic energy, means for impressing upon the accelerated particles a microwave radiation field having at least a component of its direction of propagation in the same coordinate as the direction of the added kinetic energy, and means for detecting said microwave radiation field after transmission through said gas thereby securing a spectral line response of reduced Doppler width from the said ionized gas particles.

References Cited in the file of this patent

UNITED STATES PATENTS

| 2,558,001 | Ramo | June 26, 1951 |
| 2,598,301 | Rajchman | May 27, 1952 |
| 2,670,649 | Robinson | Mar. 2, 1954 |
| 2,688,088 | Berry et al. | Aug. 31, 1954 |
| 2,749,443 | Dicke et al. | June 5, 1956 |